United States Patent Office

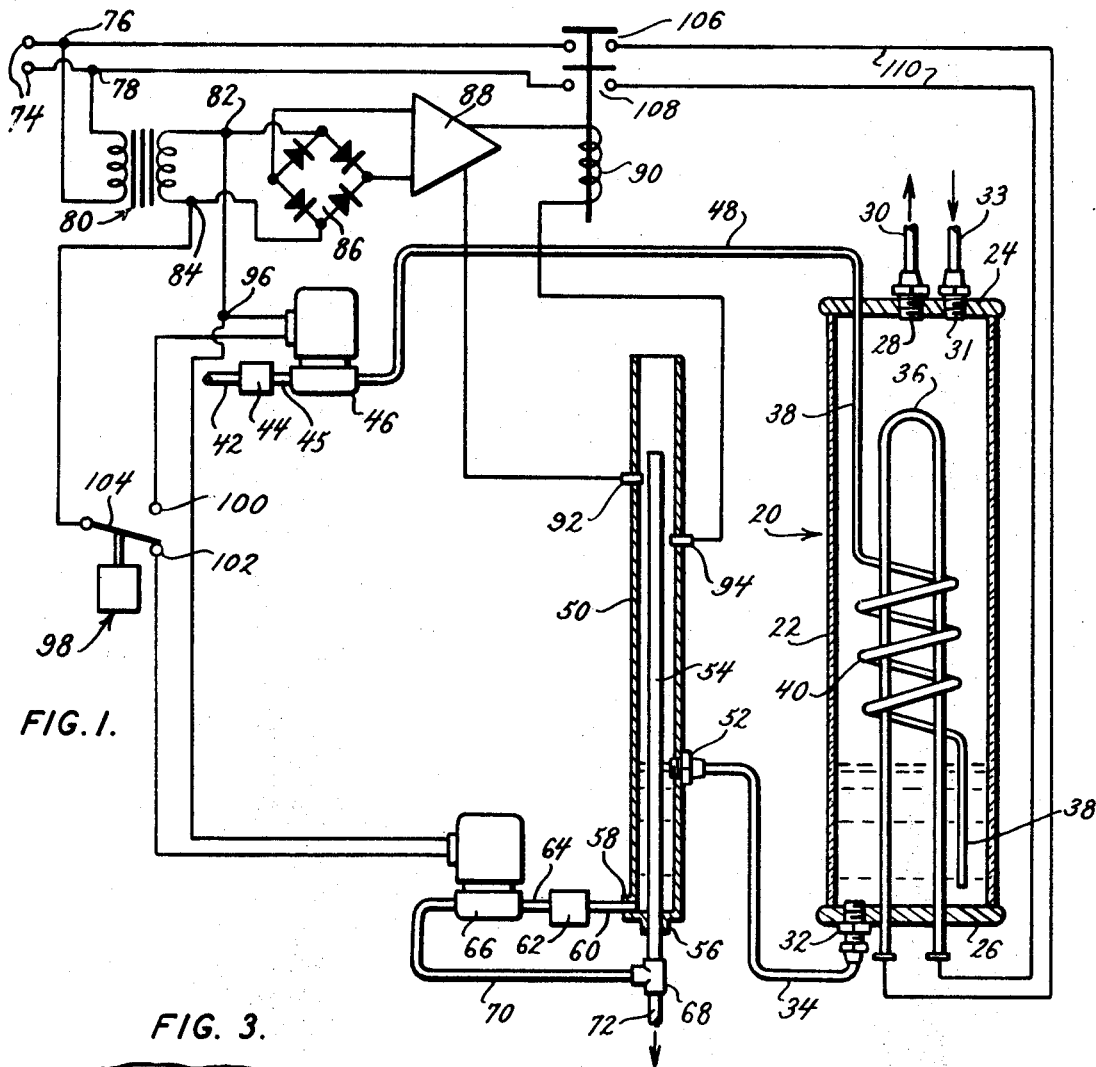
FIG. 1.
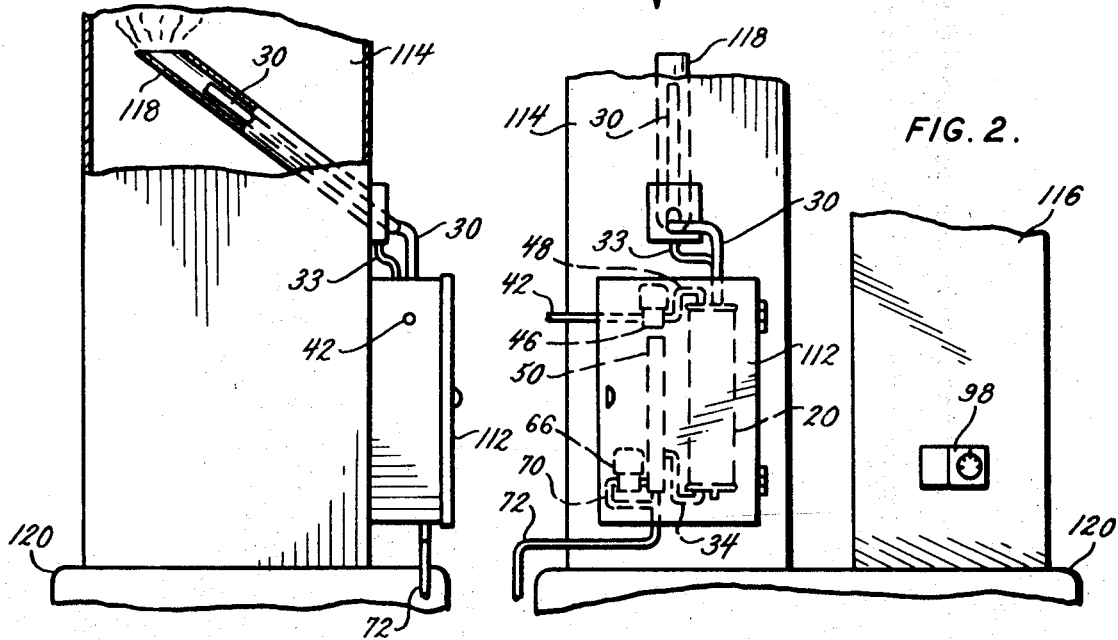
FIG. 3.
FIG. 2.

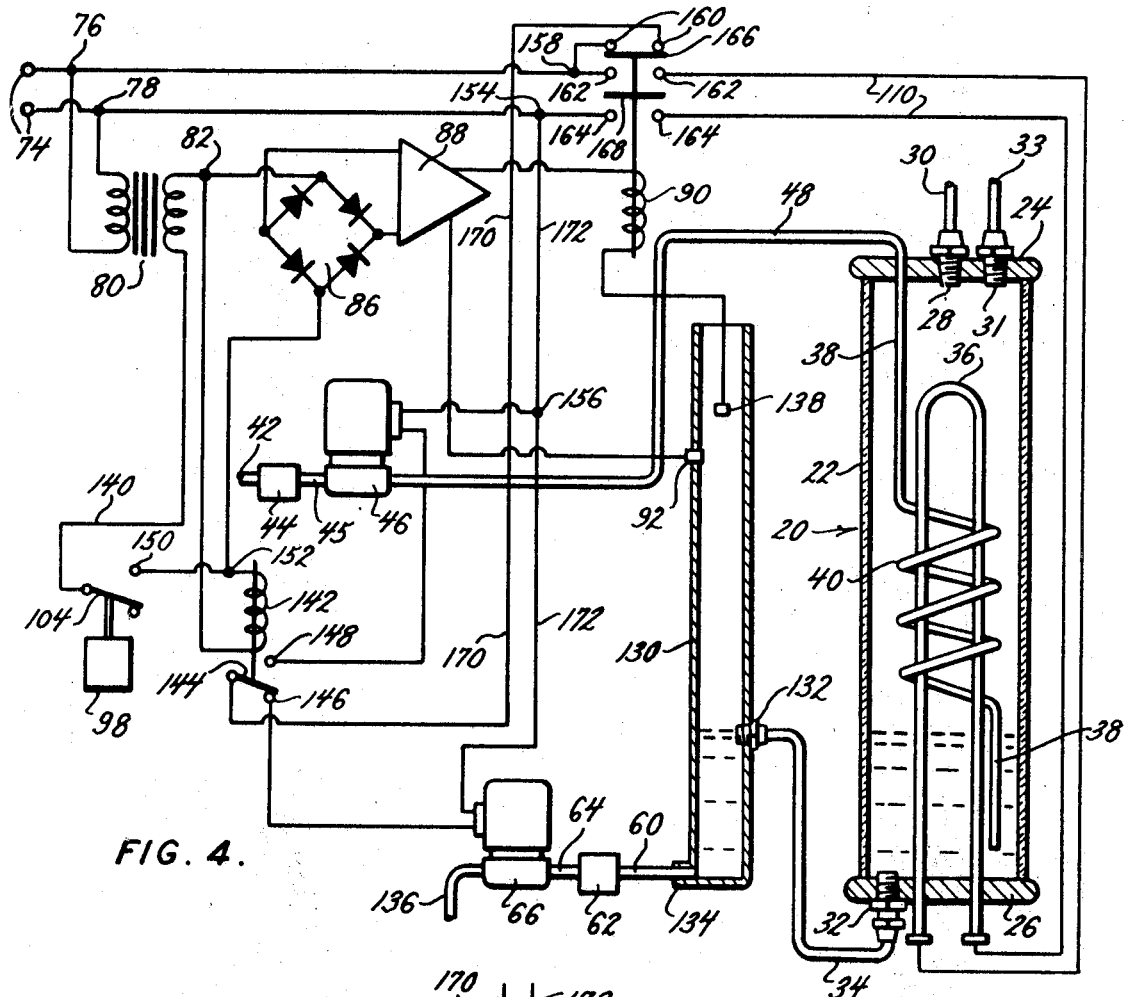

3,523,175
Patented Aug. 4, 1970

3,523,175
HUMIDIFIER
Ernest F. Gygax, 920 E. Essex, St. Louis, Mo. 63122
Filed May 27, 1968, Ser. No. 732,231
Int. Cl. F22b
U.S. Cl. 219—272                                    20 Claims

ABSTRACT OF THE DISCLOSURE

A humidifier has a boiler which vaporizes water to provide the desired moisture for a mass of air; and that humidifier keeps boiler scale from accumulating within that boiler by draining away the minerals and salts which tend to accumulate in the water in the bottom of that boiler and by keeping any minerals and salts within that bottom from becoming dry and hard.

---

This invention relates to improvements in humidifiers. More particularly, this invention relates to improvements in humidifiers which utilize boilers to vaporize water.

It is, therefore, an object of the present invention to provide an improved humidifier which utilizes a boiler to vaporize water.

The problem of maintaining adequate levels of humidity in the air within buildings which are being heated is a problem of long standing; and many different types of humidifiers have been proposed as solutions to that problem. One type of humidifier utilizes porous elements which absorb water and then permit that water to vaporize into an air stream flowing over those elements. Another type of humidifier utilizes rotatable elements which have the lower portions thereof extending into water and have the upper portions thereof extending into an air stream; and those rotatable elements carry thin films of water into that air stream to facilitate vaporization of those thin films of water. Further humidifiers utilize nozzles which form fine sprays or mists of water in an air stream; and still further humidifiers utilize boilers to vaporize water. The humidifiers which utilize porous elements to absorb water are bulky and inefficient; and they usually become even less efficient as the minerals and salts in the water fill the pores of those elements. The humidifiers which utilize rotatable elements to carry thin films of water up into air streams are bulky and are not very efficient; and the humidifiers which form fine sprays or mists of water in air streams frequently become clogged with the minerals and salts in the water, and the water of those fine sprays or mists frequently condenses on the interiors of the air ducts. The humidifiers which utilize boilers to vaporize water are frequently rendered inefficient by the development of boiler scale on the inner surfaces thereof. As a result, these various types of humidifiers have not been completely satisfactory; and hence it would be desirable to provide a humidifier which was compact, efficient, and capable of operating without accumulating boiler scale. The present invention provides such a humidifier; and it is, therefore, an object of the present invention to provide a humidifier which is compact, efficient, and operates without the accumulation of boiler scale.

The humidifier provided by the present invention utilizes a boiler to vaporize water; and it keeps boiler scale from accumulating within that boiler by draining away part of the water in the lower portion of that boiler and by keeping any minerals and salts in that lower portion from becoming dry and hard. The minerals and salts, which tend to separate from the water as the water is vaporized, will tend to move downwardly toward the bottom of the boiler, will tend to accumulate there, and will tend to incrust that bottom. However, most of those minerals and salts will be drained away, and the rest of those minerals and salts will be kept from becoming dry and hard; and hence those minerals and salts will have no real opportunity to incrust the bottom of that boiler. As a result, the boiler provided by the present invention can vaporize water without accumulating boiler scale therein. It is, therefore, an object of the present invention to provide a humidifier which utilizes a boiler to vaporize water and which keeps boiler scale from accumulating within that boiler by draining away the minerals and salts which tend to accumulate in the water in the bottom of that boiler and by keeping any minerals and salts within that bottom from becoming dry and hard.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will defined by the appended claims.

In the drawing,

FIG. 1 is a schematic showing of the component parts of one preferred embodiment of humidifier that is made in accordance with the principles and teachings of the present invention, FIG. 2 is a schematic showing of a furnace and of the ducts with which the humidifier of FIG. 1 is used, FIG. 3 is a schematic showing of the manner of mounting the humidifier on the hot air duct of FIG. 2, FIG. 4 is a schematic showing of the component parts of a seconds preferred embodiment of humidifier that is made in accordance with the principles and teachings of the present invention, and FIG. 5 is a schematic showing of a timer which can be used with the embodiment of humidifier shown in FIG. 4.

Referring to the drawing in detail, the numeral 20 generally denotes a boiler which is part of one preferred embodiment of humidifier that is made in accordance with the principles and teachings of the present invention. That boiler has a vertically-directed cylinder 22, a top 24, and a bottom 26; and that top and that bottom are suitably sealed to that cylinder. In one preferred embodiment of the present invention, the cylinder 22 is made of glass, the top 24 and the bottom 26 are made of metal, and the annular seals and clamps, not shown, releasably hold that cylinder and that top and bottom in water-tight relation. A fitting 28 is mounted within an opening in the top 24; and that fitting places the lower end of a tube 30 in communication with the interior of the boiler 20. A fitting 31 also is mounted within an opening in the top 24; and that fitting places the lower end of a tube 33 in communication with the interior of that boiler. A fitting 32 is mounted within an opening in the bottom 26; and that fitting places one end of a tube 34 in communication with the interior of the boiler 20. The bottom 26 has two further openings therein which accommodate the ends of an inverted U-shaped immersion type electric heating element 36. As shown particularly by FIG. 1, that heating element is elongated, and it extends upwardly close to the upper end of the boiler 20. The numeral 38 denotes a small-diameter tube which has a coiled portion 40 intermediate the upper and lower ends thereof; and the lower end of that tube extends toward, but terminates a short distance above, the bottom 26.

The numeral 42 denotes a pine which is connectable to a source of water, such as the source of water for the building in which the humidifier is to be used. A filter 44 and a nipple 45 connect the pipe 42 to the inlet port of a solenoid-operated valve 46; and a tube 48 connects the outlet port of that valve to the tube 38 within the boiler 20. The tube 48 can be part of, or can be suitably connected to, the tube 38.

The numeral 50 denotes a vertically-directed tube which is mounted near the boiler 20; and a fitting 52 is mounted within an opening in the wall of that tube. That fitting is located intermediate the mid-point and the bottom of the tube 50; and that fitting places the other end of the tube 34 in communication with the interior of the tube 50. A smaller-diameter tube 54 is mounted within the tube 50; and those tubes are coaxial. The upper ends of both of the tubes 50 and 54 are open, and the upper end of the tube 54 is disposed below the level of the upper end of the tube 50. Preferably, the upper end of the tube 54 is located below the level of the upper end of the heating element 36. A liquid-tight seal 56 encircles the lower end of the tube 54 and engages the lower end of the tube 50; and that liquid-tight seal will keep water from leaking out of the tube 50. A fitting 58 is disposed within an opening in the tube 50 adjacent the bottom of that tube; and a nipple 60, a filter 62, and a nipple 64 connect that fitting to the inlet port of a solenoid-operated valve 66. A T 68 has one of the inlet ports thereof connected to the bottom of the tube 54, and has the other inlet port thereof connected to the outlet port of the solenoid-operated valve 66 by a tube 70. A drain tube 72 is connected to the outlet port of the T 68 and extends to a suitable sewage connection.

The numeral 74 denotes electric terminals which can be connected to a suitable source of alternating current, such as the source of electric power within the building in which the humidifier is to be used, by a relay or the like. Junctions 76 and 78 connect the primary winding of a step-down transformer 80 to those terminals; and junctions 82 and 84 connect the secondary winding of that transformer to the input terminals of a full-wave bridge rectifier 86. The output terminals of that full-wave bridge rectifier are connected to the input terminals of an amplifier 88; and a relay coil 90 and level-sensing probes 92 and 94 are connected across the output of that amplifier. The probe 92 is sealed within an opening in the tube 50 adjacent the upper end of the tube 54, and the probe 94 is sealed within an opening in the tube 50 a short distance below the level of the probe 92. In one preferred embodiment of the present invention, the probe 92 was set about one inch below the level of the upper end of the tube 54, and the probe 94 was set about two and one-half inches below the level of the probe 92.

A junction 96 and the junction 82 connect the upper terminals of the solenoids of the solenoid-operated valves 46 and 66 to the upper terminal of the secondary winding of the transformer 80; and the lower terminal of the solenoid of the solenoid-operated valve 46 is connected to the fixed contact 100 of a humidistat 98, while the lower terminal of the solenoid of the solenoid-operated valve 66 is connected to the fixed contact 102 of that humidistat. The junction 84 connects the movable contact 104 of that humidistat to the lower terminal of the secondary winding of the transformer 80; and that movable contact will be in engagement with the fixed contact 100 whenever the humidity of the air around the humidistat 98 is below a predetermined level. However, that movable contact will move down into engagement with the fixed contact 102 whenever the humidity of that air rises above that predetermined level.

The numeral 106 denotes a set of relay contacts controlled by the relay coil 90; and the numeral 108 denotes another set of relay contacts controlled by that relay coil. The relay contacts 106 and one of the conductors of a cable 110 connect the junction 76 to one terminal of the heating element 36, while the relay contacts 108 and the other conductor of that cable connect the junction 78 to the other terminal of that heating element. The relay contacts 106 and 108 are normally open, but they will respond to energization of the relay coil 90 to close.

The humidifier is preferably encased within a cabinet 112, as shown particularly by FIGS. 2 and 3; and that cabinet can be of any suitable form and dimensions. That cabinet is shown mounted on a hot air duct 114 which extends upwardly from a furnace 120; and the humidistat 98 is shown mounted on the return air duct 116 which extends downwardly to that furnace. A tube 118 extends into the hot air duct 114; and that tube is inclined to the direction of flow of the air through that hot air duct. The tube 30 extends upwardly into the tube 118, but the upper end of the tube 30 terminates short of the upper end of the tube 118. The lower end of the tube 118 is connected to the tube 33, so any condensate which forms within the tube 118 will be collected and will drain back into the boiler 20 via the tube 33. A trap, not shown, will be interposed between the tube 118 and the tube 33 to keep steam from escaping through these tubes.

While the humidifier of the present invention can be made in different sizes, a humidifier which vaporizes water at the rate of five pounds per hour can have a boiler with an inner diameter of two inches and an overall height of about twelve inches, can have a tube 50 with an outer diameter of seven-eighths of an inch, can have a tube 54 with an outer diameter of three-eighths of an inch, can have a tube 38 with an inner diameter of five-hundredths of an inch, can have the lower end of the tube 38 disposed about one-half of an inch above the bottom 26, can have the fitting 52 disposed about three inches above the bottom 26, and can utilize a heating element rated at fifteen hundred watts.

When the furnace 120 is equipped with a blower that is energized to force air to move through the hot air duct 114 only when the temperature of the air in the air-heating chamber of that furnace attains a predetermined value, the terminals 74 will preferably be connected in parellel with that blower. In such event, the humidifier of the present invention will operate only when warm air is moving past the tube 118; and hence little or none of the steam issuing from the tube 30 will condense. If the furnace 120 is not equipped with a blower that is energized to force air to move through the hot air duct 114 only when the temperature of the air in the air-heating chamber of that furnace attains a predetermined value but is equipped with a stoker, oil burner, or gas burner, the terminals 74 will preferably be connected in parallel with that stoker, oil burner, or gas burner. In the latter event, the humidifier of the present invention will operate only when heat is being generated within the furnace 120; and hence very little of the steam issuing from the tube 30 will condense.

As long as the humidity of the air in the return air duct 116 is below a predetermined level, the movable contact 104 of the humidistat 98 will be in engagement with the fixed contact 100; and, as a result, current will flow from the upper terminal of the secondary winding of transformer 80 via junctions 82 and 96, the solenoid of solenoid-operated valve 46, fixed and movable contacts 100 and 104, and junction 84 to the lower terminal of that secondary winding. The resulting energization of that solenoid will open the solenoid-operated valve 46 and permit water to enter the boiler 20 via pipe 42, filter 44, nipple 45, solenoid-operated valve 46, tube 48, and tube 38. Some of that water will flow through fitting 32 and tube 34 and fitting 52 into the space between the tube 50 and the tube 54, but most of that water will remain within the boiler 20 and cause the water level within that boiler to rise. The water which enters the space between the tube 50 and the tube 54 will be confined within that space because the solenoid-operated valve 66 will be closed whenever the movable contact 104 of the humidistat 98 is in engagement with the fixed contact 100—and thus is out of engagement with the fixed contact 102.

As the water level in the boiler 20 rises, the water level in the space between tube 50 and tube 54 also will rise. Then, when the water in that space reaches the level of the probe 92, that water will complete a circuit from the output of amplifier 88 through relay coil 90; and, thereupon, the relay contacts 106 and 108 will close and connect the terminals of the heating eelment 36 to the terminals 74. In the said preferred embodiment of humidifier provided by the present invention, the water level in the boiler 20 rises to the level of the top of the tube 54 in about one minute; and, within one minute thereafter, the water in the boiler 20 begins to evolve steam.

During the minute, between the instant the water level in the boiler 20 rises to the level of the top of the tube 54 and the instant the temperature of the water within the boiler 20 reaches the boiling point, water will pass through fitting 32, tube 34, fitting 52, the space between tubes 50 and 54, and then flow downwardly through tube 54, T 68 and tube 72 to a sewer connection. However, because the inner diameter of the tube 38 is only five-hundredths of an inch, the amount of water that is drained away during that one minute is not significant. After the temperature of the water within the boiler 20 reaches the boiling point, the heat generated by the heating element 36 will convert part of the water, which continues to enter the boiler 20 through the tube 38, into steam; but the rest of that water will flow through fitting 32, tube 34 and fitting 52 into the space between the tubes 50 and 54, and then flow downwardly through tube 54, T 68 and tube 72 to the sewer connection. The steam which is evolved from the water within the boiler 20 will move upwardly through the fitting 28 and the tube 30, will pass through the tube 118, and will be carried away by the air flowing upwardly through the hot air duct 114. In the event the air within the duct 114 were to be relatively cool, and were to tend to cause the steam issuing from the tube 30 to condense, the tube 118 would collect any condensate which formed therein and would coact with the tube 33 to cause that condensate to drain back into the boiler 20. Usually, however, the steam from the pipe 30 will not condense; because the air flowing upwardly through the hot air duct 114 will ordinarily be warm enough to keep that steam from condensing, and that steam will admix with, and humidify, that air.

The amount of water that will be vaporized during any given period of time will be a function of the amount of heat generated by the heating element 36; and the amount of water that will pass through tube 34, through the space between tubes 50 and 54, and then downwardly through the tube 54 during that period of time will be a function of the amount of water passing through the tube 38 and also will be a function of the amount of water that is vaporized. In the said one preferred embodiment of the present invention, water was vaporized at the rate of five pounds per hour; and water was passed through tube 34, through the space between tubes 50 and 54, and then downwardly through the tube 54 at the rate of five to seven pounds per hour, depending upon the pressure of the water supplied to the pipe 42.

The solenoid-operated valve 46 will remain open as long as power is applied to the terminals 74 and the humidity of the air within the return air duct 116 is below a predetermined value; and hence water will continue to flow through the tube 38 and will keep the level of the water in the boiler 20 at the level of the top of the tube 54. The coiled portion 40 of the tube 38 acts as a heat exchanger between the hot water within the boiler 20 and the relatively-cool water within that coiled portion; and hence the water which issues from the lower end of the tube 38 will be warm rather than cool. As a result, the difference between the warmest water and the coolest water within the boiler 20 will be relatively small.

As steam is evolved from the water in the boiler 20, the percentage of minerals and salts in that water will increase; and those minerals and salts will tend to gravitate downwardly toward the lower portion of that boiler. If the bottom of the boiler 20 was sealed tight, those minerals and salts would accumulate in the lower portion of that boiler and would tend to form incrustations in the form of boiler scale. However, the bottom 26 of the boiler is provided with the fitting 32; and that fitting, the tube 34, the fitting 52, and the tubes 50 and 54 permit water to drain away from the lower portion of that boiler throughout the entire period of time water is being vaporized. As that water drains away, it will carry with it the high concentrations of minerals and salts which tend to accumulate in the lower portion of the boiler 20; and hence that water will keep those concentrations of minerals and salts from incrusting the inner surface of the boiler. The positioning of the lower end of the tube 38 close to the bottom of the boiler 20 helps reduce the tendency of the minerals and salts to incrust the interior of that boiler; because the water which issues from that lower end will agitate and stir up those minerals and salts, and will thus help those minerals and salts to be entrained within and carried away by the water which drains away via fitting 32, tube 34, fitting 52, and tubes 50 and 54.

It will be noted that the upper end of the heating element 36 extends a short distance above the level of the upper end of the tube 54; and this means that the upper end of that heating element will be above the level of the water within the boiler 20. This is desirable because it enables that portion of that heating element to be hotter than the portions of that heating element which are immersed wihin the water; and that hotter portion will tend to provide a super-heating of the steam. Super-heated steam is very desirable, because it can remain in vapor form and not condense under certain conditions which would cause ordinary steam to condense. This means that the humidifier provided by the present invention will have less of a condensate problem than do ordinary humidifiers which utilize boilers. Further, because the tube 118 surrounds and extends beyond the tube 30, any steam which condenses in the tube 118 will be recovered and will be returned to the boiler 20 via tube 33 and fitting 31.

The tubes 50 and 54 act to limit the pressure, as well as the level of the water, within the boiler 20; and, in doing so, they obviate all need of a safety valve. Specifically, the open upper end of the tube 50 keeps the pressure within the boiler 20 from building up to any appreciable extent; and, in the said preferred embodiment of the present invention, the pressure within the boiler 20 is always less than two inches water gauge.

As the humidifier continues to introduce steam into the air flowing through the hot air duct 114, the humidity of the air in the return air duct 116 will increase; and, when the humidity of the air in the return air duct 116 attains a predetermined level, the movable contact 104 of the humidistat 98 will move downwardly out of engagement with the fixed contact 100 and into engagement with the fixed contact 102. As that movable contact moves downwardly out of engagement with the fixed contact 100, the solenoid-operated valve 46 will become de-energized and will close to prevent further introduction of water into the boiler 20. As that movable contact moves downwardly into engagement with the fixed contact 102, current will flow from the upper terminal of the secondary winding of transformer 80 via junctions 82 and 96, the solenoid of the solenoid-operated valve 66, fixed and movable contacts 102 and 104, and junction 84 to the lower terminal of that secondary winding. The resulting energization of the solenoid of that solenoid-operated valve will open that valve; and, thereupon, the water within the space between the tubes 50 and 54 will drain through nipple 60, filter 62, nipple 64, solenoid-operated valve 66, tube 70, T 68, and tube 72. As the level of the water within the tube 50 falls, the level of the water in the boiler 20 will begin to fall—the water in that boiler flowing through fitting 32, tube 34, and fitting 52 into the space between the tubes 50 and 54, and then draining through nipple 60, filter 62, nipple 64, solenoid-operated valve 66, tube 70, T 68, and tube 72. The water level in the boiler 20 will hold when it is at the level of the fitting 52; and, since that fitting is just a couple of inches above the bottom 26, the total amount of water that will remain within the boiler 20 will be very small. However, that amount of water is important; because it will help keep minerals and salts from incrusting the lower portion of the boiler 20. Where all of the water has been permitted to drain out of the boiler 20, and the bottom of that boiler has dried, an incrustation of minerals and salts has developed in the lower portion of that boiler; but where a small amount of water is held within the lower portion of that boiler at all times, no such incrustation develops.

The inner diameter of the fitting 32 of the tube 34 or of the fitting 52 should be smaller than the diameter of the orifice in solenoid-operated valve 66, or a flow restrictor should be incorporated into the tube 34, to permit the water to drain out of the upper and middle portions of the space between tubes 50 and 54 before the water can drain out of the upper and middle portions of the boiler 20. If water remained in the upper and middle portions of the space between tubes 50 and 54 after the water had drained out of the boiler 20, some of the residual stream in that boiler might bubble upwardly through the space between the tubes 50 and 54 and cause sufficient moisture to remain on the inner surface of cylinder 22 to enable the probes 92 and 94 to keep the relay coil 90 energized—with continuing and objectionable energization of heating element 36. Also, by causing the water to drain out of the upper and middle portions of the space between tubes 50 and 54 before the water can drain out of the upper and middle portions of the boiler 20, the present invention keeps the water in the space between the tubes 50 and 54 from flowing back into the boiler 20—and thus keeps that water from carrying minerals and salts back into that boiler.

As the level of the water in the tube 50 falls below the level of the probe 92, the relay coil 90 will become de-energized and the relay contacts 106 and 108 will open, thereby de-energizing the heating element 36. That heating element will cool quickly and will halt the further addition of heat to the water in the boiler 20; and the small amount of water that remains in the lower portion of that boiler will cool quickly. This means that the water which remains in the boiler 20 will quickly fall below a temperature at which the minerals and salts therein could tend to incrust the inner surface of that boiler. Further, that water will have only a normal concentration of minerals and salts therein; because the continual draining away of water during the vaporization of water will prevent an undue increase in the concentration of minerals and salts in the water within the boiler 20, and because the emptying of that boiler will additionally help drain away the minerals and salts in the lower portion of that boiler.

The boiler 20 will remain very largely empty, and the tube 50 will remain empty, as long as the humidity in the air within the return air duct 116 is above a predetermined level. However, whenever that humidity falls below that level, the movable contact 104 of the humidistat 98 will move up out of engagement with the fixed contact 102 and will move into engagement with the fixed contact 100; and the solenoid-operated valve 66 will reclose. If power is then being applied to the terminals 74, the solenoid-operated valve 46 will re-open; and the boiler 20 and the tube 50 will be filled with further water, and the heating element 36 will be energized to cause further evolution of steam. As that further water fills the boiler 20, it will agitate and stir up any minerals and salts that might have accumulated in the small amount of water in the bottom of that boiler; and it will tend to carry away those minerals and salts when it starts to drain away via fitting 32, tube 34, fitting 52 and tubes 50 and 54.

As water flows through the fitting 32, the tube 34, and the fitting 52, and then upwardly through the space between the tubes 50 and 54, prior to and during the vaporization of water, it will make the concentration of ions in the water adjacent the probes 92 and 94 higher than the concentration of ions in the water within the pipe 42. That higher concentration of ions is very desirable, because it enables those probes to provide effective sensing of the level of the water within the tube 50.

The introduction of water into the boiler 20 on a continuous basis and the draining away of water from the lower portion of that boiler on a continuous basis are desirable; because they keep the water level in that boiler fixed, and because they keep the minerals and salts draining away throughout the entire vaporization of the water. However, if desired, a time switch with a short time cycle could have the contacts thereof connected between junction 96 and the upper terminal of the solenoid-operated valve 46; and that time switch could be used to effect recurrent opening and closing of that valve during each vaporization cycle. Where such a time switch was so connected, the inner diameter of the tube 38 would be increased to increase the rate of flow of water into the boiler 20, and the "on" cycles and the "off" cycles of that time switch would be selected so the water level in that boiler would remain close to the level of the top of tube 54 and so appreciable amounts of water would be drained away via fitting 32, tube 34, fitting 52 and tubes 50 and 54 during each of those "on" cycles.

FIG. 4 shows a second preferred embodiment of humidifier that is made in accordance with the principles and teachings of the present invention; and that preferred embodiment utilizes a boiler 20 which can be identical to the similarly-numbered boiler in FIG. 1. However, instead of having the tube 34 connected to the fitting 52 of the tube 50, the humidifier of FIG. 4 has the tube 34 connected to a fitting 132 mounted in the wall of a tube 130. The tube 130 closely resembles the tube 50, but it has a closed bottom and it does not have an inner tube such as the tube 54. A fitting 134, comparable to the fitting 58 in FIG. 1, is mounted in the wall of the tube 130 adjacent the bottom of that tube; and that fitting receives the right-hand end of the nipple 60. The oulet port of the solenoid-operated valve 66 in FIG. 4 is connected to a sewage connection by a drain tube 136.

The tube 130 has a probe 92, which can be identical to the similarly-numbered probe in FIG. 1, sealed within the wall thereof. In addition, the tube 130 has a probe 138 mounted adjacent the top thereof close to the geometric center thereof; and that probe is located above the level of the probe 92.

A conductor 140 connects the lower terminal of the secondary winding of transformer 80 to the movable contact 104 of the humidistat 98. The lower fixed contact of that humidstat is not used; but the upper fixed contact 150 of that humidistat is connected to one output terminal of the full wave bridge rectifier 86 and to one terminal of a relay coil 142 by a junction 152. The other output terminal of the full wave bridge rectifier 86 and the other terminal of the relay coil 142 are connected to the upper terminal of the secondary winding of the transformer 80 by the junction 82. The numeral 144 denotes a movable contact which is controlled by the relay coil 142, and that movable contact normally engages fixed contact 146 but will respond to energization of that relay coil to move out of engagement with that fixed contact and into engagement with fixed contact 148. Fixed contact 148 is directly connected to the lower terminal of the solenoid of solenoid-operated valve 46, and the upper terminal of that solenoid is connected to the lower of the terminals 74 by junction 156, a conductor 172, a junction 154, and junction 78. The fixed contact 146 is directly connected to the lower terminal of the solenoid of solenoid-operated valve 66; and the upper terminal of that solenoid is connected to the lower terminal 74 by junction 156, conductor 172, and junctions 154 and 78.

A junction 158 connects the left-hand contact of a pair of spaced contacts 160 and the left-hand contact of a pair of spaced contacts 162 to the junction 76; and the junction 154 connects the left-hand contact of a pair of spaced contacts 164 to the junction 78. The right-hand contacts 162 and 164 are connected by the conductors of the cable 110 to the terminals of the heating element 36; while the right-hand contact 160 is directly connected to the movable contact 144 by a conductor 170. The armature of the relay coil 90 has movable contacts 166 and 168 thereon; and the movable contact 166 will bridge the spaced contacts 160 whenever the relay coil 90 is de-energized, but that movable contact will bridge spaced contacts 162 and the movable contact 168 will bridge the spaced contacts 164 whenever that relay coil is energized.

Where the humidifier of FIG. 4 is to be used with a furnace that is equipped with a selectively-operable blower, the terminals 74 will be connected in parallel with that blower. Where that humidifier is to be used with a furnace which does not have a selectively-operable blower but which has a stoker, oil burner or gas burner, the terminals 74 will be connected in parallel with that stoker, oil burner or gas burner. As a result, power will be supplied to the terminals 74 only when the furnace is receiving heat or is in a heated condition.

Whenever the relative humidity of the air in the return duct of the furnace is above a predetermined level, the movable contact 104 of the humidistat 98 will be out of engagement with the stationary contact 150 of that humidistat. This means that no current will be flowing through the relay coil 142; and hence the movable contact 144 will be in engagement with the fixed contact 146 and out of engagement with the fixed contact 148. As a result, solenoid-operated valve 46 will be closed and will keep water from entering the boiler 20; but solenoid-operated valve 66 will be kept open by current flowing from upper terminal 74 via junctions 76 and 158, contacts 160 and 166, conductor 170, movable and fixed contacts 144 and 146, the solenoid of that solenoid-operated valve, conductor 172, and junctions 156, 154 and 78 to the lower terminal 74. This means that the tube 130 will be empty and that the level of the water in the boiler 20 will be no higher than the level of the fitting 132 as long as the relative humidity of the air in the return duct of the furnace is above the predetermined level.

Whenever the relative humidity of the air in the return duct of the furnace is below the predetermined level, the movable contact 104 of the humidistat 98 will be in engagement with the fixed contact 150 of that humidistat. At such time, current will flow from the upper terminal of the secondary winding of transformer 80 via junction 82, the input terminals of fullwave bridge rectifier 86, junction 152, fixed and movable contacts 150 and 104, and conductor 140 to the lower terminal of that secondary winding; and current also will flow from the upper terminal of that secondary winding via junction 82, relay coil 142, junction 152, fixed and movable contacts 150 and 104, and conductor 140 to the lower terminal of that secondary winding. The D.C. voltage which develops at the output terminals of the fullwave bridge rectifier 86 will be applied to the amplifier 88, but that amplifier will not be able to cause current to flow through the relay winding 90 because the tube 130 will be empty. However, the energization of relay coil 142 will shift the movable contact 144 out of engagement with fixed contact 146 and into engagement with fixed contact 148.

As the movable contact 144 moves out of engagement with the fixed contact 146, the solenoid of the solenoid-operated valve 66 will become de-energized; and, thereupon, that valve will close. As that movable contact moves into engagement with the fixed contact 148, current will flow from the upper terminal 74 via junctions 76 and 158, contacts 160 and 166, conductor 170, movable and fixed contacts 144 and 148, the solenoid of solenoid-operated valve 46, junction 156, conductor 172, and junctions 154 and 78 to the lower terminal 74. The resulting energization of that solenoid will open the solenoid-operated valve 46; and, as a result, water will flow from pipe 42 via filter 44, nipple 45, solenoid-operated valve 46, tube 48 and tube 38 into the boiler 20. Part of that water will cause water to flow through fitting 32, tube 34, and fitting 132 into the tube 130, but most of that water will remain within the boiler 20 and raise the level of the water in that boiler. In actual practice, the level of the water in the boiler 20 will be about one quarter of an inch higher than the level of the water in the tube 130 until after the water in that tube has reached the probe 138 and has enabled current to flow through the amplifier 88 and relay coil 90 and shift the movable contacts 166 and 168 downwardly. The movement of movable contact 166 out of engagement with spaced contacts 160 will de-energize the solenoid of solenoid-operated valve 46; and, thereafter, no further water will flow into the boiler 20 from the tube 38—permitting the water levels in the tube 130 and in the boiler 20 to equalize. The movement of movable contact 166 down into engagement with spaced contacts 162 and the movement of movable contact 168 down into engagement with spaced contacts 164 will energize the heating element 36; and, thereupon, that heating element will begin to supply heat to the water in the boiler 20.

Within a very short time, steam will be evolved; and that steam will move upwardly through fitting 28 and tube 30 and into and through the tube 118 in the hot air duct all as explained hereinbefore in connection with the humidifier shown in FIG. 1. As steam is evolved in the boiler 20, a small super-atmospheric pressure—usually less than two inches water gauge—will develop in that boiler and will force the water level in that boiler downwardly until the level of water in the tube 130 is between an inch and an inch and three-quarters above the level of the probe 138. The heater 36 will remain energized, and will continue to convert water into steam, until enough water in the boiler 20 has been converted into steam to cause the level of the water in the tube 130 to fall below the level of the probe 138. At such time, the relay coil 90 will become de-energized, and will permit the movable contacts 166 and 168 to move back up to their normal position—thereby de-energizing the heating element 36 and re-energizing the solenoid of the solenoid-operated valve 46. As that solenoid becomes re-energized, it will re-open that solenoid-operated valve and permit additional water to enter the boiler 20 via tube 38. That additional water will replenish the water that was converted to steam and also will force some of the water in the bottom of the boiler 20 to flow into the tube 130 via fitting 32, tube 34 and fitting 132—that water carrying with it some of the minerals and salts which drifted down into the bottom of that boiler. Still further water in the bottom of the boiler 20 will be forced to flow into the tube 130 via fitting 32, tube 34 and fitting 132 as steam is generated and again develops a small super-atmospheric pressure in that boiler; and that water will carry with it further of the minerals and salts which drifted down into the bottom of that boiler. As the minerals and salts enter the tube 130, they will largely drift down into that portion of that tube which is below the level of the fitting 132; and this is important, because it will largely keep those minerals and salts from moving back into the boiler 20 as some of the water in the tube 130 flows back into that boiler while the water in that boiler is boiling and as further of that water flows back into that boiler to equalize the water levels in that tube and boiler when the boiling ceases. The overall result is that substantially all of the minerals and salts which are carried over from the bottom of the boiler 20 into the tube 130, as additional water is added to that boiler and as a super-atmospheric pressure is developed within that boiler, will remain in that tube; and this is very desirable.

The humidifier shown in FIG. 4 will recurrently permit make-up water to enter the boiler 20—that water entering that boiler via tube 38 whenever the level of the water in the tube 130 is below the level of the probe 138 and the relay coil 90 permits contacts 160 and 166 to energize the solenoid of solenoid-operated valve 46. The influx of make-up water will be halted whenever the level of the water in the tube 130 rises to the level of the probe 138 and the relay coil 90 becomes energized to move contact 166 downwardly away from spaced contacts 160 to de-energize the solenoid of solenoid-operated valve 46.

Whenever the relative humidity of the air in the return duct of the furnace reaches the predetermined level, the movable contact 104 of the humidistat 98 will move downwardly out of engagement with the fixed contact 150, with resultant de-energization of fullwave rectifier 86 and of relay coil 142. Thereafter, until that movable contact again moves up into engagement with that fixed contact, the relay coil 90 will be unable to move the movable contacts 166 and 168 downwardly, and the relay coil 142 will be unable to hold the movable contact 144 in engagement with the stationary contact 148. As the relay coil 90 becomes de-energized, the movable contacts 166 and 168 will move upwardly and de-energize the heating element 36, and the movable contact 160 will move into position to bridge the spaced contacts 160. The bridging of the spaced contacts 160 will not be able to re-energize the solenoid of the solenoid-operated valve 46, because the movable contact 144 will be out of engagement with the fixed contact 148. Instead, the bridging of the spaced contacts 160 will cause current to flow from upper terminal 74 via junctions 76 and 158, contacts 160 and 166, conductor 170, fixed and movable contacts 144 and 146, the solenoid of solenoid-operated valve 66, conductor 172, and junctions 156, 154 and 78 to the lower terminal 74. The consequent energization of that solenoid will open that solenoid-operated valve; and, thereupon, the water will drain out of the tube 130, and the level of the water in the boiler 20 will drop down to the level of the fitting 132. Thereafter, until the relative humidity of the air in the return duct of the furnace again falls below the predetermined level, the solenoid-operated valve 46 will remain closed, and the solenoid-operated valve 66 will remain open while power is applied to the terminals 74.

As pointed out hereinbefore, some of the water adjacent the bottom of the boiler 20 moves via fitting 32, tube 34 and fitting 132 into the tube 130 whenever make-up water is introduced into that boiler. In addition, more of the water adjacent the bottom of that boiler moves into the tube 130 as the pressure in that boiler increases and raises the level of the water in that tube above the level of the water in that boiler. All of that water will carry minerals and salts out of the boiler 20 and into the tube 130; and that is desirable, because it will keep those minerals and salts from tending to form an incrustation on the inner surface of the boiler 20. Further, as pointed out hereinbefore, those minerals and salts will drift toward the portion of tube 130 which is below the level of the fitting 132; and hence those minerals and salts will not tend to move back into the boiler 20 as water flows back into that boiler from the tube 130—either as the water levels in that boiler and tube fall during a boiling cycle or as the water levels in that boiler and tube equalize at the end of a boiling cycle.

At the time the solenoid of the solenoid-operated valve 66 is energized to open that valve, further water will flow from the boiler 20 via fitting 32, tube 34 and fitting 132 into the tube 130; and that water will then drain out through fitting 134, nipple 60, filter 62, nipple 64, solenoid-operated valve 66 and drain tube 136. Because the fitting 32 is in the bottom 26 of the boiler 20, the minerals and salts which are in the water in that boiler and which tend to drift toward the bottom 26 will be carried out with the water that initially drains out of that fitting when the solenoid-operated valve 66 is opened. The water which was in the upper portion of the boiler 20, and which was largely depleted of its minerals and salts during the recurrent boiling cycles of the humidifier, will be the water which remains in the lower portion of that boiler after the water level falls below the level of the fitting 132; and that water will keep the bottom of the boiler wet, and thus will keep any minerals or salts therein from becoming dry and hard. All of this means that there will be a lower-than-normal concentration of minerals and salts in the water in the bottom of the boiler 20 after that boiler has been drained, and that the said water will keep any minerals or salts therein from becoming dry and hard.

The humidifier shown in FIG. 1 will be used where the water is unusually "hard," and thus has an unusually high percentage of minerals and salts therein; because that humidifier continuously drains away the concentrations of minerals and salts in the bottom of the boiler 20 during the entire time steam is being evolved. The humidifier shown in FIG. 4 will be used where the water is "soft" or is only moderately "hard"; because that humidifier will drain away the concentrations of minerals and salts in the bottom of the boiler 20 only during and shortly after the periods when make-up water is introduced and during those periods when the movable contact 104 of the humidistat 90 moves away from fixed contact 150.

Where the water is more than moderately "hard" but is not unusually "hard," the humidifier shown in FIG. 4 can be modified by the addition thereto of the timer shown in FIG. 5. That timer utilizes a thermal switch 184 which includes a heating element 186 and heat-sensitive contacts 188. The movable contact of the thermal switch 184 is connected to the fixed contact 146 by a junction 190, and the stationary contact of that thermal switch is connected to the conductor 170 by junctions 180 and 182. One terminal of the heating element 186 of that thermal switch is connected to the conductor 170 by the junction 180, and the other terminal of that heating element is connected to the conductor 172 by a junction 192.

Whenever the movable contact 104 of humidistat 98 is out of engagement with fixed contact 150 and power is applied to the terminals 74 of the humidifier of FIG. 4, modified by the addition of the timer of FIG. 5, current will flow from upper terminal 74 via junctions 76 and 158, contacts 160 and 166, conductor 170, junction 182, movable and fixed contacts 144 and 146, junction 190, the solenoid of solenoid-operated valve 66, junction 192, conductor 172, and junctions 156, 154 and 78 to the lower terminal 74. The resulting energization of that solenoid will cause the solenoid-operated valve 66 to open and drain the tube 130 and the boiler 20. Current also will flow from upper terminal 74 via junctions 76 and 158, contacts 160 and 166, conductor 170, junctions 182 and 180, heating element 186, junction 192, conductor 172, and junctions 156, 154 and 78 to the lower terminal 74; and the heat from that heating element will cause the contacts 188 to open.

Whenever the movable contact 104 of humidistat 98 is in engagement with fixed contact 150 and power is applied to the terminals 74 of the humidifier of FIG. 4, modified by the addition of the timer of FIG. 5, current will flow from the upper terminal of the secondary winding of transformer 80 via junction 82, the input terminals of fullwave bridge rectifier 86, junction 152, fixed and movable contacts 150 and 104, and conductor 140 to the lower terminal of that secondary winding; and current also will flow from the upper terminal of that secondary winding via junction 82, relay coil 142, junction 152, fixed and movable contacts 150 and 104, and conductor 140 to the lower terminal of that secondary winding. The D.C. voltage which develops at the output terminals of the fullwave bridge rectifier 86 will be applied to the amplifier 88, but that amplifier will not be able to cause current to flow through the relay winding 90 because the tube 130 will be empty. However, the energization of relay coil 142 will shift the movable contact 144 out of engagement with fixed contact 146 and into engagement with fixed contact 148.

As the movable contact 144 moves out of engagement with the fixed contact 146, the solenoid of the solenoid-operated valve 66 will become de-energized; and, thereupon, that valve will close. The contacts 188 of thermal switch 184 are in parallel with the now-separated movable and fixed contacts 144 and 146; but those contacts will remain open as long as heating element 186 remains energized, and hence the solenoid-operated valve 66 will be permitted to close.

As movable contact 144 moves into engagement with the fixed contact 148, current will flow from the upper terminal 74 via junctions 76 and 158, contacts 160 and 166, conductor 170, junction 182, movable and fixed contacts 144 and 148, the solenoid of solenoid-operated valve 46, junction 156, conductor 172, and junctions 154 and 78 to the lower terminal 74. The resulting energization of that solenoid will open the solenoid-operated valve 46; and, as a result, water will flow from pipe 42 via filter 44, nipple 45, solenoid-operated valve 46, tube 48 and tube 38 into the boiler 20. Part of that water will cause water to flow through fitting 32, tube 34, and fitting 132 into the tube 130, but most of that water will remain within the boiler 20 and raise the level of the water in that boiler. In actual practice, the level of the water in the boiler 20 will be about one quarter of an inch higher than the level of the water in the tube 130 until after the water in that tube has reached the probe 138 and has enabled current to flow through the amplifier 88 and relay coil 90 and shift the movable contacts 166 and 168 downwardly. The movement of movable contact 166 out of engagement with spaced contacts 160 will de-energize the solenoid of solenoid-operated valve 46; and, thereupon, no further water will flow into the boiler 20 from the tube 38—permitting the water levels in the tube 130 and in the boiler 20 to equalize. The movement of movable contact 166 out of engagemnet with spaced contacts 160 also will de-energize the heating element 186 of the thermal switch 184.

The movement of movable contact 166 down into engagement with spaced contacts 162 and the movement of movable contact 168 down into engagement with spaced contacts 164 will energize the heating element 36; and, thereupon, that heating element will begin to supply heat to the water in the boiler 20. Within a very short time, steam will be evolved; and that steam will move upwardly through fitting 28 and tube 30 and into and through the tube 118 in the hot air duct, all as explained hereinbefore in connection with the humidifier shown in FIG. 1. As steam is evolved in the boiler 20, a small super-atmospheric pressure—usually less than two inches water gauge—will develop in that boiler and will force the water level in that boiler downwardly until the level of water in the tube 130 is between an inch and an inch and three-quarters above the level of the probe 138. The heater 36 will remain energized, and will continue to convert water into steam, until enough water in the boiler 20 has been converted into steam to cause the level of the water in the tube 130 to fall below the level of the probe 138. At such time, the relay coil 90 will become de-energized, and will permit the movable contacts 166 and 168 to move back up to their normal position—thereby de-energizing the heating element 36 and re-energizing the solenoid of the solenoid-operated valve 46, re-energizing the heating element 186 of thermal switch 184, and re-energizing the solenoid of solenoid-operated valve 66 by the current which flows through now-closed contacts 188. Thereupon, the solenoid-operated valve 66 will open and permit water to drain from the tube 130 and also from the boiler 20; and that solenoid-operated valve will remain open until heat from the heating element 186 causes the contacts 188 to open and de-energize the solenoid of that solenoid-operated valve. In one preferred embodiment of the timer shown in FIG. 5, the contacts 188 remain closed, and thus hold the solenoid-operated valve 66 open, for ten seconds after the movable contact 166 moves upwardly and bridges the spaced contacts 160. During those ten seconds, minerals and salts in the lower portions of the tube 130 and boiler 20 can drain away through fitting 134, nipple 60, filter 62, nipple 64, solenoid-operated valve 66, and drain tube 136.

Once the contacts 188 have opened, those contacts will remain open for an appreciable period of time—because of the thermal capacity of the heating element 186. Prior to the time that heating element cools sufficiently to permit the contacts 188 to re-close, the level of the water in the boiler 20 will have risen sufficiently to cause the water in the tube 130 to rise up to the level of the probe 138—with a consequent re-energization of the relay coil 90. This means that by the time the contacts 188 have re-closed, the movable contact 166 will have been moved downwardly out of bridging relation with the spaced contacts 160; and hence the solenoid-operated valve 66 will remain closed until the level of the water in the tube 130 again falls below the level of probe 138. The solenoid-operated valve 44 will close as the movable contact 166 moves downwardly out of bridging relation with the spaced contacts 160; and that solenoid-operated valve also will remain closed until the level of the water in the tube 130 again falls below the level of the probe 138.

Whenever the level of the water in the tube 130 again falls below the level of the probe 138, the relay coil 90 will again permit movable contact 166 to move upwardly into of bridging relation with the spaced contacts 160—with consequent re-opening of solenoid-operated valves 46 and 66. The solenoid-operated valve 66 will remain open for ten seconds, to permit minerals and salts in the lower portions of the tube 130 and boiler 20 to drain away, and then that valve will close. The solenoid-operated valve 46 will remain open until the level of the water in the tube 130 again rises to the level of the probe 138, and then that valve will close. Thereafter both of those solenoid-operated valves will remain closed until the level of the water in the tube 130 again falls below the level of the probe 138. All of this means that minerals and salts in the lower portions of tube 130 and boiler 20 will be permitted to drain away for a short period of time during each period when make-up water is being added to the boiler. As a result, the timer shown in FIG. 5 makes it feasible to use the humidifier of FIG. 4 in water that is more than moderately "hard" but is not unusually "hard."

Whenever the relative humidity of the air in the return duct of the furnace rises to the predetermined level, the movable contact 104 of the humidistat 98 will move out of engagement with the contact 150; and, thereupon, the relay coils 142 and 90 will become de-energized. The solenoid-operated valve 46 will remain closed, and thereby keep further make-up water from entering the boiler 20, but the solenoid-operated valve 66 will open and permit the tube 130 to drain and the upper and middle portions of boiler 20 to drain. The water which was in the upper portion of the boiler 20, and which was largely depleted of its minerals and salts during the recurrent boiling cycles of the humidifier, will be the water which remains in the lower portion of that boiler after the water level falls below the level of the fitting 132; and that water will keep the bottom of the boiler wet, and thus will keep any minerals or salts therein from becoming dry and hard. All of this means that there will be a lower-than-normal concentration of minerals and salts in the water in the bottom of the boiler 20 after that boiler has been drained, and that the said water will keep any minerals or salts therein from becoming dry and hard.

In one preferred embodiment of the humidifier of FIG. 4, modified by the timer of FIG. 5, the make-up water requires about fifteen seconds to raise the level of the water in tube 130 to the level of probe 138, steam begins to evolve within five seconds after the solenoid-operated valve 46 re-closes, steam is evolved for about six minutes, and solenoid-operated valve 66 drains away the minerals and salts in the lower portions of tube 130 and boiler 20 for about ten seconds. That embodiment operates very effectively and with no accumulation of boiler scale in boiler 20 or tube 130.

Whereas the drawing and accompanying description have shown and described preferred embodiments of the present invention, it should be apparent to those skilled in the art that various changes may be made in the form of the invention without affecting the scope thereof.

What I claim is:

1. A humidifier which has a boiler that can operate without appreciable accumulation of boiler scale therein and which comprises:
    a water-holding chamber,
    a source of heat for the water within said water-holding chamber,
    an opening adjacent the top of said water-holding chamber to permit steam to issue from said water-holding chamber and to pass to a mass of air to humidify said mass of air,
    a second water-holding chamber,
    said second water-holding chamber having a portion thereof vertically coextensive with a portion of the first said water-holding chamber,
    a tube having one end thereof communicating with said first said water-holding chamber adjacent the bottom of said first said water-holding chamber and having the other end thereof communicating with said second water-holding chamber,
    a valve that is connected to said first said water-holding chamber and is connectable to a source of water and that is selectively openable to permit said source of water to introduce water into said first said water-holding chamber without having to pass through said second water-holding chamber,
    level-controlling means coacting with said valve to normally maintain a predetermined water level in said first said water-holding chamber,
    said tube having said other end thereof disposed below the level of said predetermined water level so said tube can respond to introduction of water into said first said water-holding chamber, due to opening of said valve, to permit make-up water to flow from the lower portion of said first said water-holding chamber into said second water-holding chamber,
    said make-up water which flows from said lower portion of said first said water-holding chamber into said second water-holding chamber via said tube carrying away from said first said water-holding chamber and into said second water-holding chamber concentrations of minerals and salts which otherwise would tend to accumulate in the bottom of said first said water-holding chamber,
    a second valve that is openable to permit water to drain from said first said water-holding chamber, and
    a control element that is operable to effect opening of said second valve and thereby permit water to drain from said first said water-holding chamber via said second valve,
    said water which drains away from said first said water-holding chamber via said second valve carrying with it any concentrations of minerals and salts therein, whereby concentrations of minerals and salts in the water in said lower portion of said first said water-holding chamber are carried away from said first said water-holding chamber whenever the first said valve introduces make-up water into said first said water-holding chamber, and whereby further concentrations of minerals and salts are drained away from said first said water-holding chamber whenever said control element effects opening of said second valve.

2. A humidifier as claimed in claim 1 wherein said other end of said tube is connected to said second water-holding chamber at a point above the level of the bottom of said second water-holding chamber, said tube constituting the sole means of introducing water into said second water-holding chamber, said tube introducing water into said second water-holding chamber at said point above the level of the bottom of said second water-holding chamber so concentrations of minerals and salts passing through said tube can tend to accumulate adjacent said bottom of said second water-holding chamber and thus below the level of said point.

3. A humidifier as claimed in claim 1 wherein said control element is a humidistat, said control element effecting opening of said second valve and thereby permitting water to drain from said first said water-holding chamber whenever the humidity adjacent said humidistat is above a predetermined level, said control element also preventing opening of said first said valve and thereby preventing introduction of water into said first said water-holding chamber whenever the humidity adjacent said humidistat is above said predetermined level.

4. A humidifier as claimed in claim 1 wherein said second valve is connected to said second water-holding chamber, wherein said second valve in an electrically-operated valve, and wherein said other end of said tube is spaced above the level of said second valve, whereby water draining from said first said water-holding chamber, as said second valve is opened, will flow consecutively through said tube and then through the lower portion of said second water-holding chamber to said second valve.

5. A humidifier as claimed in claim 1 wherein said second water-holding chamber has an overflow pipe therein, and wherein said first said valve introduces water into said first said water-holding chamber at a rate greater than the rate at which said source of heat can convert water in said first said water-holding chamber into steam, whereby water will enter said first said water-holding chamber and pass through said tube and pass through said second water-holding chamber and enter said overflow tube while said first said valve is open.

6. A humidifier as claimed in claim 1 wherein said second water-holding chamber has an overflow pipe therein, and wherein said first said valve introduces water into said first said water-holding chamber continuously while said source of heat is converting water in said first said water-holding chamber into steam.

7. A humidifier as claimed in claim 1 wherein a water-supplying tube is disposed within said first said water-holding chamber, said water-supplying tube receiving water from said first said valve and conducting said water into said lower portion of said first said water-holding chamber, wherein said level-controlling means normally maintains a predetermined water level within said first said water-holding chamber, and wherein the lower end of said water-supplying tube is below the level of said predetermined water level.

8. A humidifier as claimed in claim 1 wherein a water-supplying tube is disposed within said first said water-holding chamber, said water-supplying tube receiving water from said first said valve and conducting said water into said lower portion of said first said water-holding chamber, said water-supplying tube extending close to said bottom of said first said water-holding chamber, and thereby causing water introduced into said first said water-holding chamber to agitate and stir up any concentrations of minerals and salts in said lower portion of said first said water-holding chamber.

9. A humidifier as claimed in claim 1 wherein a water-supplying tube is disposed within said first said water-holding chamber, said water-supplying tube receiving water from said first said valve and conducting said water into said lower portion of said first said water-holding chamber, said water-supplying tube having a coiled portion intermediate the ends thereof that acts as a heat exchanger between the heated water in said first said water-holding chamber and the cooler water from said first said valve.

10. A humidifier as claimed in claim 1 wherein said source of heat has generally vertically-directed arms and a closed end portion, wherein the effective lengths of said vertically-directed arms are disposed below the level of the water in said first said water-holding chamber to heat said water, and wherein said closed end portion extends above the level of the water in said first said water-holding chamber to superheat the steam evolved from said water in said first said water-holding chamber.

11. A humidifier as claimed in claim 1 wherein said second water-holding chamber has said level-controlling means associated therewith to control the level of the water in said second water-holding chamber, wherein said tube has a cross section smaller than the cross section of either the first said or said second water-holding chamber, wherein said tube constitutes essentially the only communication between the first said and said second water-holding chambers, and wherein said tube is located so it is normally completely filled with water, said level-controlling means tending to effect opening of said first said valve whenever the level of the water in said second water-holding chamber falls below a predetermined point, the pressure developed in said first said water-holding chamber as said source of heat converts water in said first said water-holding chamber into steam acting through the water in said tube to cause the level of the water in said second water-holding chamber to rise above said predetermined point.

12. A humidifier as claimed in claim 1 wherein said second water-holding chamber has said level-controlling means associated therewith to control the level of the water in said second water-holding chamber, said level-controlling means tending to effect opening of said first said valve whenever the level of the water in said second water-holding chamber falls below a predetermined point, wherein said tube has a cross section smaller than the cross section of either the first said or said second water-holding chamber, and wherein said tube permits water to flow from said first said water-holding chamber into said second water-holding chamber but keeps any agitation at the surface of the water in said first said water-holding chamber from causing equal agitation at the surface of the water in said second water-holding chamber, whereby said level-controlling means senses essentially agitation-free water in said second water-holding chamber.

13. A humidifier as claimed in claim 1 wherein said second valve is connected to said second water-holding chamber adjacent the bottom of said second water-holding chamber, whereby opening of said second valve will substantially completely drain said second water-holding chamber, wherein said control element is a humidistat, and wherein said control element effects opening of said second valve each time the humidity adjacent said control element increases to a predetermined level.

14. A humidifier as claimed in claim 1 wherein said second water-holding chamber has an overflow pipe therein, and wherein said first said valve introduces water into said first said water-holding chamber at a rate greater than the rate at which said source of heat can convert water in said first said water-holding chamber into steam, said overflow pipe setting the normal level for the water in said water-holding chambers.

15. A humidifier as claimed in claim 1 wherein said tube is connected to said second water-holding chamber at a point above the level of the bottom of said second water-holding chamber, wherein said second valve is connected to said second water-holding chamber, wherein said tube has a cross section smaller than the cross section of either the first said or said second water-holding chamber, wherein said tube is located so it is normally filled with water, and wherein said second water-holding chamber has said level-controlling means associated therewith to control the level of the water in said water-holding chambers, said level-controlling means tending to effect opening of said first said valve whenever the level of the water in said second water-holding chamber falls below a predetermined point, said level-controlling means determining the normal level of the water in said first said water-holding chamber and the connection of said tube to said second watre-holding chamber determining the drained level of the water in said first said water-holding chamber.

16. A humidifier as claimed in claim 1 wherein an electric probe is associated with said second water-holding chamber and is part of level-controlling means for the water in said second water-holding chamber, the water in said second water-holding chamber having a higher concentration of minerals and salts therein than the water introduced into said first said water-holding chamber by said first said valve, and said higher concentration of minerals and salts increasing the effectiveness of said poles.

17. A humidifier as claimed in claim 1 wherein said control element is a timer that periodically opens said second valve, said second valve thereafter remaining open for a predetermined length of time, and a circuit that actuates said timer to open said second valve whenever said first said valve is opened, whereby water will be simultaneously introduced into and drained away from said first said water-holding chamber.

18. A humidifier as claimed in claim 1 wherein a steam tube extends from said first said water-holding chamber into an air stream and wherein an outer tube surrounds and extends beyond the end of said steam tube, said outer tube collecting steam which condenses as it issues from said steam tube and thereby minimizing the amount of condensed steam within said air stream.

19. A humidifier as claimed in claim 1 wherein a steam tube extends from said first said water-holding chamber into an air stream, wherein an outer tube surrounds and extends beyond the end of said steam tube, and wherein said outer tube is in communication with said first said water-holding chamber, so steam which condenses in said outer tube can drain back into said first said water-holding chamber.

20. A humidifier as claimed in claim 1 wherein a steam tube extends from said first said water-holding chamber into an air stream and wherein an outer tube surrounds and extends beyond the end of said steam tube, said outer tube collecting steam which condenses as it issues from said steam tube, said outer tube being inclined to said air stream and having the open end thereof pointing downstream of said air stream.

References Cited

UNITED STATES PATENTS

| | | | |
|---|---|---|---|
| 2,287,376 | 6/1942 | Furlong et al. | 122—382 |
| 2,328,538 | 9/1943 | Furlong | 126—113 |
| 2,347,490 | 4/1944 | Legeman | 219—272 X |
| 2,733,693 | 2/1956 | Johnsson | 122—382 X |
| 2,804,067 | 8/1957 | Elgin. | |
| 2,810,381 | 10/1957 | Knight | 126—113 |
| 2,883,511 | 4/1959 | Gooldy | 219—272 X |
| 3,209,125 | 9/1965 | Morrissey | 219—272 |

JOSEPH V. TRUHE, Primary Examiner

P. W. GOWDEY, Assistant Examiner

U.S. Cl. X.R.

122—379, 382; 126—113